United States Patent [19]

Hinojosa

[11] Patent Number: 5,536,762
[45] Date of Patent: Jul. 16, 1996

[54] FUGITIVE INK FOR MARKING COTTON BALES AND LIKE FIBERS

[75] Inventor: Jesse Hinojosa, Maxwell, Tex.

[73] Assignee: Indeco Products, Inc., San Marcos, Tex.

[21] Appl. No.: 425,272

[22] Filed: Apr. 20, 1995

[51] Int. Cl.$^6$ ............................. C09D 5/00; C09D 11/00; C08K 5/41; D06P 5/13
[52] U.S. Cl. ..................... 523/161; 524/167; 524/265; 8/403; 106/19 R; 106/20 R; 106/22 R; 106/22 D
[58] Field of Search ............................ 523/161; 524/167, 524/715, 743, 265, 261, 268; 106/19 R, 20 R, 22 R, 22 D; 8/403

[56] References Cited

U.S. PATENT DOCUMENTS

| | | | |
|---|---|---|---|
| 2,802,713 | 8/1957 | Olpin et al. | 8/56 |
| 2,802,714 | 8/1957 | Olpin et al. | 8/56 |
| 2,959,461 | 11/1960 | Murray | 8/56 |
| 3,503,087 | 3/1970 | Wolf et al. | 8/164 |
| 3,663,262 | 5/1972 | Cogan, Jr. | 117/62.1 |
| 3,819,324 | 6/1974 | Bino | 8/164 |
| 4,102,644 | 7/1978 | Hauser et al. | 8/164 |
| 4,141,684 | 2/1979 | Kuhn | 8/39 |
| 4,167,510 | 9/1979 | Brendle | 260/174 |
| 4,505,944 | 3/1985 | Turner | 427/8 |
| 4,640,690 | 2/1987 | Baumgartner et al. | 8/506 |
| 4,732,570 | 3/1988 | Baumgartner et al. | 8/506 |
| 4,877,411 | 10/1989 | Hines et al. | 8/403 |
| 5,108,460 | 4/1992 | Hines et al. | 8/403 |

OTHER PUBLICATIONS

Martin Sherwood and Christine Sutton, "The Physical World," 22 (1991).

Primary Examiner—Paul R. Michl
Assistant Examiner—LaVonda R. DeWitt
Attorney, Agent, or Firm—Pravel, Hewitt, Kimball & Krieger

[57] ABSTRACT

This invention relates to a fugitive ink for marking cotton modules or other like fibers wherein the ink dries in less than about two hours in the field and does not fade or wash away when the module or fiber is stored in all-weather conditions open to the elements, but wherein the ink is removed upon mechanical agitation of the fiber and the scouring/bleaching process used by textile mills. The ink composition comprises a water-soluble dyestuff, such as a sulfone containing dyestuff, a polymeric resin emulsion, a wetting agent and water.

11 Claims, No Drawings

FUGITIVE INK FOR MARKING COTTON BALES AND LIKE FIBERS

BACKGROUND OF THE INVENTION

1. Field of Invention

This invention relates to a fugitive ink for marking cotton modules or bales and the like wherein the ink dries rapidly in the field and does not fade or wash away upon several months exposure to the elements but wherein the ink is removed upon mechanical agitation of the fiber and the scouring/bleaching process used by textile mills.

2. Description of the Related Art

There is a recognized need for a fugitive composition to mark cotton modules or bales and other like fibers wherein the mark will not disappear or fade when the module or bale is stored in all-weather conditions open to the elements, but which can be removed when desired. Since the mark on cotton modules is applied in the field, it is also very important to provide a fast-drying material so that if the bale is exposed to rain, the dyestuff will not bleed or run on the cotton. The mark must persist notwithstanding months of exposure to rain, air, sunlight, wind, heat and cold. A further consideration for the ink is that the mark must vanish upon the mechanical agitation of the fibers and upon the scouring/bleaching processes of the textile mills, to which the fibers are subject as a matter of course prior to use. A further desirable property for the ink is that it be efficiently and safely dispensable, as, in particular, from an aerosol can.

A fugitive ink for marking cotton bales and the like is disclosed in U.S. Pat. No. 4,505,944 to Turner. The Turner ink has had serial drawbacks as a commercial product. It has had a tendency to explode when stored in an aerosol can. It has also not proven itself amenable to efficient or complete aerosol dispersal. Further, the ink itself appears to penetrate the fibers, raising the possibility that even after substantial "decolorization," the ink could have a permanent effect.

Other references disclosing the use of various dyestuffs on cotton materials are found in U.S. Pat. Nos. 3,503,087 to Wolfe et. al., 2,959,461 to Murray et. al., and 2,802,713 and 2,802,714 to Olphin et. al. However, none appear to be concerned with the field application of a fugitive dyestuff on cotton modules.

The Wolfe ink disclosed in U.S. Pat. No. 3,503,087 does not offer the strengths needed for a composition which can withstand outdoor weather conditions, such as wind, rain, heat, cold, and sunlight. Furthermore, 3,503,087 discloses batch tinting as a means for the application of the ink to cotton modules. Based on my experience, this means of application does not produce definitive characters on the module surface.

My use of the Murray ink of U.S. Pat. No. 2,959,461 shows that it does not satisfy the necessary criteria of definitive character marking for cotton modules. Rather, its main emphasis is to provide sighting colors for textile materials. Air drying time is not critical in such an application.

I have found that the Olphin ink of U.S. Pat. No. 2,802,713 does not satisfy the requirements necessary for properly marking cotton modules. Although the U.S. Pat. No. 2,802,713 ink lends itself well to indoor textile mill environments for batch coding operations wherein one kind of yarn can be distinguished from another at a glance, it does not offer any of the requirements necessary for a fugitive ink that would be subjected to all types of outdoor weather conditions. In addition, U.S. Pat. No. 2,802,713 utilizes a potentially environmentally hazardous N-vinyl pyrrolidone component.

The Olphin ink of U.S. Pat. No. 2,802,714 requires a means of drying other than by air, and thus is not suitable for outdoor cotton module marking use.

SUMMARY OF THE INVENTION

It is an object of the present invention to provide an improved fugitive ink for marking cotton fibers which is particularly suitable for use on cotton bales because of its fast drying properties. This ink will spray efficiently from an aerosol can, will not tend to explode when stored in the can, will offer a bright mark that does not fade upon exposure to the elements for several months, and will, leave no permanent effect upon the fibers after treatment with mechanical agitation and a scouring/bleaching process. The latter objective is furthered by an ink that tends to coat rather than penetrate the fibers. The ink will dry in two hours or less in ambient conditions in the field, thus the time for the drying of the ink is short enough to substantially remove the risk of rain occurring during the drying period. The short drying time minimizes the risk of bleeding or running of the dyestuff on the cotton, which might render the mark illegible. This is desirable since the mark identifies the owner of the module or bale, and if the mark becomes illegible during shipping or handling prior to processing, bale ownership can be difficult to determine.

The present invention produces an improved fugitive ink with a substantial absence of pigment or surfactant effect. The ink of the present invention is not wicked into the fibers. It does not chemically react with the fibers to stain them. Rather, the ink of the present invention has the tendency to coat the surface of the fibers as opposed to penetrating the fibers.

The ink is also compatible with nitrogen as a propellant. Thus, it eliminates "foaming effects" experienced in aerosol cans with previous market samples of the known prior art products. Because of the ability to use nitrogen as a propellant with the instant invention, the total contents of an aerosol container can be utilized with minimal waste.

The present invention also does not require an acid component. Thus, container failures due to acidic action on the aerosol containers can be reduced.

The ink/emulsion composition of the invention includes a water soluble dyestuff, a copolymer resin, a wetting agent and water. The ink/emulsion composition can be further cut with a diluting agent, such as water, for packaging in a dispensing container, such as an aerosol can.

The function of the polymer resin is to retain the dyestuff, such that the dye does not bleed or run-out when the applied and dried ink comes into contact with water. The wetting agent serves to improve the distribution of the dye without precipitating any bleeding. Water functions to solubilize the dyestuff.

Such a combination has been found to produce a fugitive ink that will substantially coat the fibers without penetrating. When dry, the ink withstands months of exposure to the elements such as rain, air, sunlight, wind, heat and cold. It will be removed, however, by the mechanical agitation of the fibers and scouring/bleaching processes to which the fibers are habitually subjected prior to utilization.

The stated combination of ingredients thus has the properties of being fast drying, insoluble in water when dry, no wicking of the pigment into the fibers, and the absence of staining the cotton fibers themselves through a chain of chemical changes. The ink is also amenable to aerosol application because it is compatible with compressed gases such as nitrogen or nitrous oxide as a propellant, thereby eliminating the foaming effect seen with some other products. Use of nitrogen and other inert gases as a propellant permits the total contents of the container to be efficiently dispersed, minimizing waste.

DESCRIPTION OF THE PREFERRED EMBODIMENTS

The ink/emulsion and water composition includes a water soluble dyestuff comprising by weight from about 0.2% to about 6% of the composition and a copolymer resin that comprises by weight from about 6% to about 30% of the composition. The composition further includes water comprising by weight about 60% to about 93% of the composition and a wetting agent comprising by weight about 0.09% to about 0.56% of the total composition.

In the preferred embodiment, the dye is specifically comprised of sulfone acid groups in a range, by weight, of about 0.2% to about 6% of the composition. The sulfone groups are preferred because sulfone acid groups are solubilizing agents. Pigments, on the other hand, do not contain sulfone acid groups, consequently pigments are insoluble in water.

The dye percent range of about 0.2% to about 6% has been found by trial and error to provide the best results for a fugitive ink for the definitive character marking of cotton modules. If values lower than about 0.2% are used, the ink does not produce a mark that is definitive enough to distinguish it against the background color of the cotton module composition. On the other hand, if values higher than about 6% are used, the ink bleeds due to the high ratio of resin to dye, and the markings may become illegible.

The resin range of about 6% to about 30% is necessary to accept the dye and distribute it over the cotton module surface. The resin content has to be at this level to form a quick drying brittle film.

The water range of about 60% to about 93% is found to be optimum because it offers the required functions (i.e. quick drying and weather resistance) and is economical.

The present invention utilizes an acrylic copolymer emulsion specially prepared to achieve an ink which will withstand all outdoor weather conditions. This is accomplished by maintaining a pH level of the ink and other components at between about 6 and about 8. If a pH level of the ink and other components is below 6, the ink coagulates and does not form a film. On the other hand, if the pH level is above 8, the texture of the ink becomes too soft to attain weather resistant, definitive character. By keeping the pH level within the range of about 6–8, a brittle, weather resistant, definitive character can be attained.

An acrylic polymer emulsion, sold under the trademark "NeoCryl BT-520" or "BT-5", is preferred for the resin because "BT-520" possesses good weatherability and also dries quickly in open air. To my knowledge, "BT-520" does not include acrylamide, which is a component of an Olphin ink described in aforementioned U.S. Pat. No. 2,802,714. The approximate drying time is about 1 to about 1½ hours. Maintaining the pH level between about 6 and about 8 results in "BT-520" forming a brittle film, a desirable characteristic of the present invention.

The following examples are illustrative of the invention and do not limit the scope of the invention as described above and claimed below.

EXAMPLE 1

A red fugitive ink composition was prepared by sequentially mixing together, in the order listed, the components of Table 1.

TABLE 1

| Component | wt % of total composition |
|---|---|
| Water | 76.6 |
| A dyestuff of the azo family (C.I. Acid red 337) sold under the designation "C-K Nylanthrene red GN" which is 33% liquid. | 3.3 |
| An acrylic copolymer emulsion sold under the designation "NeoCryl BT-520" | 19.8 |
| A polyether modified dimethylpolysiloxane wetting agent sold under the trademark "BYK-348" | 0.3 |

EXAMPLE 2

A blue fugitive ink composition was prepared by sequentially mixing, in the order listed, the components of Table 2.

TABLE 2

| Component | wt % of total composition |
|---|---|
| Water | 77.7 |
| A dyestuff of the anthraquinone family (C.I. Acid blue 324) sold under the designation "C-K Nylanthrene Blue BAR" which is 67% liquid | 2.0 |
| An acrylic copolymer emulsion sold under the designation "NeoCryl BT-520" | 20.0 |
| A polyether modified dimethylpolysiloxane wetting agent sold under the trademark "BYK-348" | 0.3 |

EXAMPLE 3

A black fugitive ink composition was prepared by mixing together, in the order listed, the components of Table 3.

TABLE 3

| Component | wt % of total composition |
|---|---|
| Water | 78.2 |
| A dyestuff of the metallized azo family (C.I. Acid Black) sold under the designation "C-K Intrachrome Black RPL" which is 50% liquid | 1.4 |
| An acrylic copolymer emulsion sold under the designation "NeoCryl BT-520" | 20.0 |
| A polyether modified dimethylpolysiloxane wetting agent sold under the trademark "BYK-348" | 0.3 |

After applying the inks of Examples 1–3 to samples (both raw cotton and grey cotton fabric), the ink was dried for at least 4 hours, but no more than overnight. The sample was then placed into the scouring solution of Table 4, at a solution to fiber volume ratio of 30:1, and boiled for 30 minutes. The fabric was then rinsed at a boil in tap water for several minutes. The fabric was then placed in the bleaching solution of Table 5 at room temperature and heated to 150° F. After holding for 30–60 minutes it was rinsed at 150° F. Then the fabric was rinsed with tap water of approximately 80° F.

TABLE 4

Scouring Solution

| Component | Portion |
| --- | --- |
| Sodium Hydroxide | 1.0 g |
| Sodium Carbonate | 0.25 g |
| A wetting agent sold by Rohm & Haas Company under the trademark "Triton X-100" | 0.25 g |
| Water | 100 ml |

TABLE 5

Bleaching Solution

| Component | Portion |
| --- | --- |
| Hydrogen Peroxide | 1.5 ml |
| Sodium Silicate | 0.75 g |
| A wetting agent sold by Rohm & Haas Company under the trademark "Triton X-100" | 0.10 g |
| Water | 100 ml |

The test fabrics were inspected for remaining ink either by eye or by placing the fabric under a black light system. In the black light system, anything other than white becomes clearly visible under the light. Results of the inspection showed that the ink was removable under the stated scouring/bleaching conditions.

The red, blue, and black fugitive inks of Examples 1–3 were also tested for their fugitive properties by applying the inks to Greige fabric. Greige fabric is fabric just off the loom or knitting machine and thus is in an unfinished state.

After applying the ink, the sample was scoured in the solution of Table 6 for 45 minutes at 180° F. and then rinsed. The fabric was then bleached in the bath of Table 7. The bleaching procedure consisted of 5 adding the fabric to the solution at a ratio of 10:1 (liquor to fabric). One half of the hydrogen peroxide was added at 130° F. and the remainder at 175° F. The bleaching was then run at 200° F. for one hour.

TABLE 6

Scouring Solution B

| Component | Portion |
| --- | --- |
| Hydrogen Peroxide | 3.0 g |
| An extraction agent for cotton processing sold under the trademark "Lufribrol KB Lig" | 1.5 g |
| A surfactant sold under the designation "Kieralon TX-199 (NB-JET K)" | 1.5 g |

TABLE 6-continued

Scouring Solution B

| Component | Portion |
| --- | --- |
| Water | 1 ml |

TABLE 7

Bleaching Solution B

| Component | Portion |
| --- | --- |
| An organic peroxide stabilizer sold under the trademark "Prestogen K" | 0.9 g |
| Chelate 80 activating agent | 1.0 g |
| Sodium Hydroxide | 4.0 g |
| Hydrogen Peroxide (35%) | 7.0 g |
| A surfactant sold under the trademark "Kieralon NB-OL" | 1.5 g |
| Water | 1.0 L |

Tests on the black module marking ink of Example 3 indicate that it is durable to rain, removable under normal bleaching conditions, and removable during mechanical processing (ginning, opening, cleaning, carding, etc.). The tests on the red and blue module marking inks of Examples 1 and 2 also indicate that they are removable under normal bleaching conditions and removable during mechanical processing.

Drying time of the red, blue, and black fugitive inks of Example 1–3 were compared with that of the Turner ink described in aforementioned U.S. Pat. No. 4,505,944, which is a leading module marking product. Each ink was sprayed via aerosol can onto raw picked cotton samples. The inks were then allowed to dry for 1 hour outdoors. Weather conditions were sunny at 57° F., with a wind velocity of 9 mph. At the end of 1 hour, each sample was rinsed with water. The red, blue, and black fugitive inks remained clearly legible and did not exhibit any sign of bleeding. On the other hand, the Turner ink was not legible and bled throughout the cotton sample. Test results illustrate the improved drying time for these fugitive inks.

The above disclosed and described fugitive ink is particularly suited for, but not limited to, marking definitive characters on cotton modules or other like fibers that are stored outdoors. The fugitive ink normally dries within about 1 to 1½ hours after application. The once dried fugitive ink remains legible and does not bleed on the modules/fibers upon several months exposure to any weather conditions, but the ink is removed upon mechanical agitation of the fiber and the scouring/bleaching process used by textile mills.

The foregoing disclosure and description of the invention and preferred embodiments are illustrative and explanatory thereof. Variations and modifications may be made, as would be apparent to those skilled in the art, without departing from the spirit of the invention. They are to be considered as within the scope of the following claims.

I claim:

1. A fugitive ink composition suitable for marking cotton or other fibrous material in a module or bale, comprising:

(a) a water-soluble dyestuff;

(b) a polymeric resin emulsion;

(c) a wetting agent; and (d) water wherein the weight percentage of said water-soluble dyestuff is between about 0.2% and about 6%, the weight percentage of polymeric resin ranges from about 6% to about 30%, the weight percentage of water ranges from about 60% to about 93% and the weight percentage of wetting agent ranges from about 0.09% to about 0.56%, and wherein the ink when applied to the surface of a bale or module dries on the fibrous material to form a substantially non-penetrating weather resistant coating that can be removed by mechanical and/or scouring/bleaching processes.

2. The fugitive ink composition of claim 1 wherein the ink dries in less than about two hours.

3. The fugitive ink composition of claim 1, wherein the composition has a pH in the range from about 6.0 to about 8.0.

4. The fugitive ink composition of claim 1 wherein the water-soluble dyestuff contains sulfone acid groups.

5. The fugitive ink composition of claim 1 or claim 4 wherein the polymeric resin emulsion comprises an alkali soluble acrylic copolymer emulsion.

6. The fugitive ink composition of claim 4 wherein the dyestuff is selected from the group consisting of a Red Nylanthrene dyestuff, Blue Nylanthrene and Black Intrachrome dyestuff.

7. The fugitive ink composition of claim 1 wherein said wetting agent is comprised of a polyether modified dimethylpolysiloxane.

8. The fugitive ink composition of claim 1 or claim 4, further compromising a diluting agent.

9. The fugitive ink composition of claim 8 packaged in an aerosol can with an inert gaseous propellant.

10. The fugitive ink composition of claim 9 wherein the inert gaseous propellent is chosen from the group consisting of nitrogen and nitrous oxide.

11. The fugitive ink composition of claim 1 or claim 4 wherein the said fibrous material is chosen from the group consisting of cotton bales and cotton modules.

* * * * *